United States Patent

Johnson

[15] 3,636,262

[45] Jan. 18, 1972

[54] TRANSLATION DATA CHANGE CIRCUITS FOR TELEPHONE SWITCHING SYSTEMS

[72] Inventor: Glover Douglas Johnson, Naperville, Ill.

[73] Assignee: Bell Telephone Laboratories, Incorporated, Murray Hill, N.J.

[22] Filed: Jan. 8, 1970

[21] Appl. No.: 1,376

[52] U.S. Cl. ....................................................179/18 ET

[51] Int. Cl. ....................................................H04q 3/47

[58] Field of Search ............179/18 ET, 18 ES, 18 EA, 7 MM

[56] References Cited

UNITED STATES PATENTS

| | | | |
|---|---|---|---|
| 3,527,896 | 9/1970 | Hills et al. | 179/18 ET |
| 3,267,220 | 8/1966 | Maneschi | 179/18 ET |

*Primary Examiner*—Kathleen H. Claffy
*Assistant Examiner*—Thomas W. Brown
*Attorney*—R. J. Guenther and R. B. Ardis

[57] ABSTRACT

A translation data recent change arrangement for a telephone switching system in which the data is normally available to central control from a first store during one part of the control cycle. During another part of the cycle the same or updated data in a second store is compared with the corresponding data in the first store. If the two data groups fail to match, the more recent data from the second store is written into the corresponding location of the first store. The translation data available to central control is thus maintained current. The second store is provided with two storage areas; while one is providing data for comparison, the other is available for the introduction of later changes, the second store readout alternating between the two areas.

12 Claims, 2 Drawing Figures

INVENTOR
G. D. JOHNSON
BY William H. Kamstra
ATTORNEY

TRANSLATION DATA CHANGE CIRCUITS FOR TELEPHONE SWITCHING SYSTEMS

BACKGROUND OF THE INVENTION

This invention relates to automatic telephone switching systems and particularly to circuits within such systems adapted to store information employed in responding to customer service requests.

In telephone switching systems having common control it is necessary to translate incoming signals from a subscriber line into a form suitable for use by the control circuits to establish a talking path through the system switching network. Data relating, for example, to customer lines and trunks, routing and charging, service class, and the like is stored in the system; this data is then the basis for translating a service request into signals for controlling the establishment of the desired connection. The conversion of a directory number to its associated line equipment number is one specific example of such a translation. In electromechanical switching systems this data is stored as a wired program, that is, a program consisting of the wiring interconnections within the control equipment such as the markers in a crossbar system. Manifestly, when the data must be changed because of changes in any of the aforementioned equipment and services, the program must be changed by rewiring applicable interconnections.

With the advent of electronic telephone switching systems such as that described, for example, in *The Bell System Technical Journal*, Vol. 43, Sept. 1964, at page 1831, changing the translation data is greatly simplified. In such a telephone system the establishment of a talking connection in response to a subscriber request for service is controlled by a program stored in a memory. Translation data is also thus stored and may be readily changed in response to changes in line and trunk equipment, for example, simply by rewriting the information as a pattern of permanent magnets on a data card and substituting this card in the memory for the data card containing the obsolete information. The advantages of this system in terms of flexibility over prior art electromechanical switching systems are apparent. Changed or new services and features are relatively simply introduced by modifying the contents of the memory storage cells.

The translation data changes, however, are not made as they are received by the system. Data which has been recently changed is initially stored in a call store to which store reference is continuously made during the operation of the system to verify the currency of the translation data. Eventually, a collection of recent changes in the call store must be transcribed into the memory containing the stored program. This is accomplished by the time-consuming method mentioned in the foregoing of rewriting the magnet cards and returning them to the memory. During the rewrite operation the translation data is most vulnerable to error particularly when the storage addresses are scattered over several portions of the program store memory.

The problem of updating the translation data based on recent changes has in the past not been particularly acute. In local offices the number of recent changes is limited and predictable. In large toll systems, on the other hand, the number of recent changes increases substantially due to the large number of offices involved and are frequently unpredictable. The capacity for the storage of recent change translation data could be exhausted by some unforeseen event such as a hurricane or military crisis which would require extensive network routing changes. Flexibility of system action could thus be severely restricted.

It is an object of this invention to provide for the rapid and ready electrical alterability of translation data in an electronic telephone switching system as changes occur therein.

Another object of this invention is the provision of a new and novel means for ensuring that the most recent translation data is always available for responding to subscriber service requests in an electronic telephone switching system. No verification of the currency of the translation data is required.

Still another object of this invention is to maintain the accuracy of translation data in an electronic telephone system and to prevent its mutilation during interrogation and updating.

BRIEF DESCRIPTION OF THE INVENTION

The foregoing and other objects of this invention are realized in one illustrative embodiment thereof in which the recent changes in translation data are initially stored in a relatively slow access primary translation memory such as, for example, a magnetic disc or drum. The storage area of the memory is divided into two sections, one containing the valid, presently used translation data required by the telephone system and the other containing updated translation data stored there as the result of recent change processing. The disc or drum memory is interfaced with the central control of the electronic switching system through a secondary translation store which in access time is compatible with the cycle time of the system. Translation data from the disc or drum memory is written into the secondary translation store via a wired-logic comparator circuit. The latter circuit includes a buffer register to which a translation data word and its address are transferred from the disc or drum memory.

As indicated in the referenced *Bell System Technical Journal*, in order to increase system reliability, call stores are provided in a duplicated arrangement and interconnected with central control via a duplicated call store bus. In this fashion one of the call stores serves as an active unit while its duplicate is in an inactive or standby mode. The secondary translation stores are similarly provided on a duplicated basis, interconnected with central control via the same duplicated call store bus mentioned above. Similarly, one of the secondary translation stores serves as an active unit while its duplicate is in an inactive or standby mode. The selection of the active and standby units is controlled by central control and by the maintenance control center.

In the method herein proposed for introducing recent changes, the active secondary translation store continues to furnish translation data to central control and the standby secondary translation store has its data altered (via the wired logic comparator circuit) to agree with the updated translation data stored in the primary translation memory. The updated standby secondary translation store is then switched into service as the active store, with the other unit retaining the original data until it is found that satisfactory system operation is obtained with the updated copy. After proper system operation is obtained, the other secondary translation store is similarly filled with updated data. The wired logic comparator is also used for routinely auditing or comparing the contents of the secondary translation store with that of the primary translation memory.

At a predetermined time during a normal operative cycle of the switching system, the secondary translation data store is ordered by the central control of the system to read out the contents stored at the address now in the buffer register of the comparator circuit. A comparison is made by the latter circuit of the translation data output with that stored in the buffer register. If a mismatch is indicated, the data presently in the buffer register will be written at the designated address of the secondary translation data store. The contents of the latter store is in this manner periodically audited to ensure that the translation data conforms to that in the presently valid section of the disc or drum memory.

According to one feature of this invention, the updating of translation data in an electronic telephone switching system is accomplished electrically and periodically by comparing presently valid data with that available for system operation to ensure that the most recent changes control.

DESCRIPTION OF THE DRAWING

The foregoing and outer objects and features of this invention will be better understood from a consideration of the detailed description of one illustrative embodiment thereof which follows when taken in conjunction with the accompanying drawing in which.

DETAILED DESCRIPTION

Figure 1:
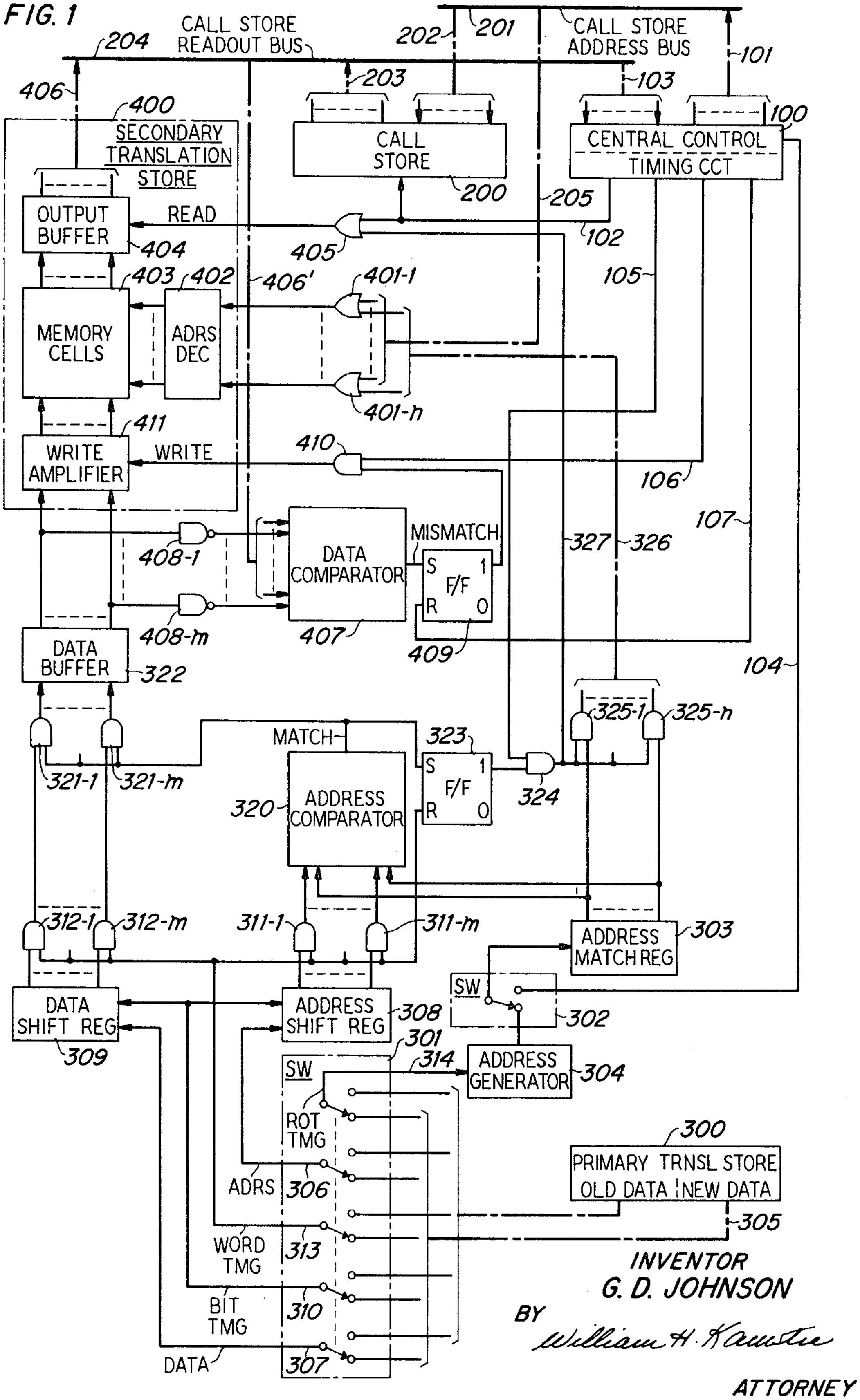
FIG. 1 depicts in block symbol form the organization and logic control of one illustrative translation data store according to this invention and FIG. 2 is a chart indicating the sequence and timing of events during an illustrative operation of the circuit of FIG. 1.

The circuit arrangement of this invention is advantageously adapted for employment with the prior art electronic switching system described in detail in the aforementioned *Bell System Technical Journal* (BSTJ) article. Accordingly, in order to avoid undue complexity and extraneous circuit detail, in FIG. 1 is shown only so much of that system as is necessary for a complete understanding of the organization and operation of this invention. Thus, since the central control comprises the primary information processing unit of the switching system and originates all of the instructions for the operation of the present invention, it is included in FIG. 1 as the block symbol 100. In the prior art system, the central control directs the system operations under instructions from the program stored in memory in the program store. In the electronic switching system contemplated in connection with this invention, a program store also supplies the specific instructions for controlling the central control and hence the system functions.

In present day electronic systems, in distinction from the system with which this invention is adapted for use, the program store also contains the translation data as previously mentioned. Accordingly, since in this invention the program store is relieved of this storage function, the store is not specifically included in the drawing. Recent changes in the translation data are presently stored in memory in a call store of the system. As will be come apparent hereinafter, these recent changes are stored in accordance with the present invention in primary and secondary translation stores forming components of the invention. However, since the recent change translation circuitry of the invention is interfaced with the prior art switching system via call store buses and during the call store access cycle, a call store is included in FIG. 1 as the block symbol 200.

Continuing with a consideration of the organization of this invention depicted in FIG. 1, a primary translation store 300 initially stores the presently valid translation data as well as the translation data recently updated. The store 300 may comprise either a well-known disc or drum memory having relatively slow access times. Since such stores are commercially available and their operation familiar to one skilled in the art, the store 300 need not be described here in detail other than to indicate the character of the information to be obtained therefrom. A secondary translation store 400 is provided which is directly accessed by central control to supply the translation data required to perform a call completion operation of the system. The character of the store 400 and details of the circuits included therein will become apparent from the description of its operation hereinafter. Since each of the components of the store 400 is well known in the art their detail will be readily appreciated from the functions performed.

The primary translation store 300 has its memory divided into two areas: one containing the above-mentioned currently valid translation data and the other containing the data incorporating the most recent changes. This information is introduced into the store 300 from an offline processor where it may also be verified as received from a number of possible sources. Since the circuits comprising the input to the store 300 do not constitute essential elements of the organization of this invention and, in any event, are well known in the art, they are not shown in the drawing. The remainder of the details of the invention including illustrative wired logic for accomplishing particular read, write, and comparison operations under the direction of central control 100 will be best understood from a description of the operation of the invention with reference to the timing chart of FIG. 2.

Figure 2:
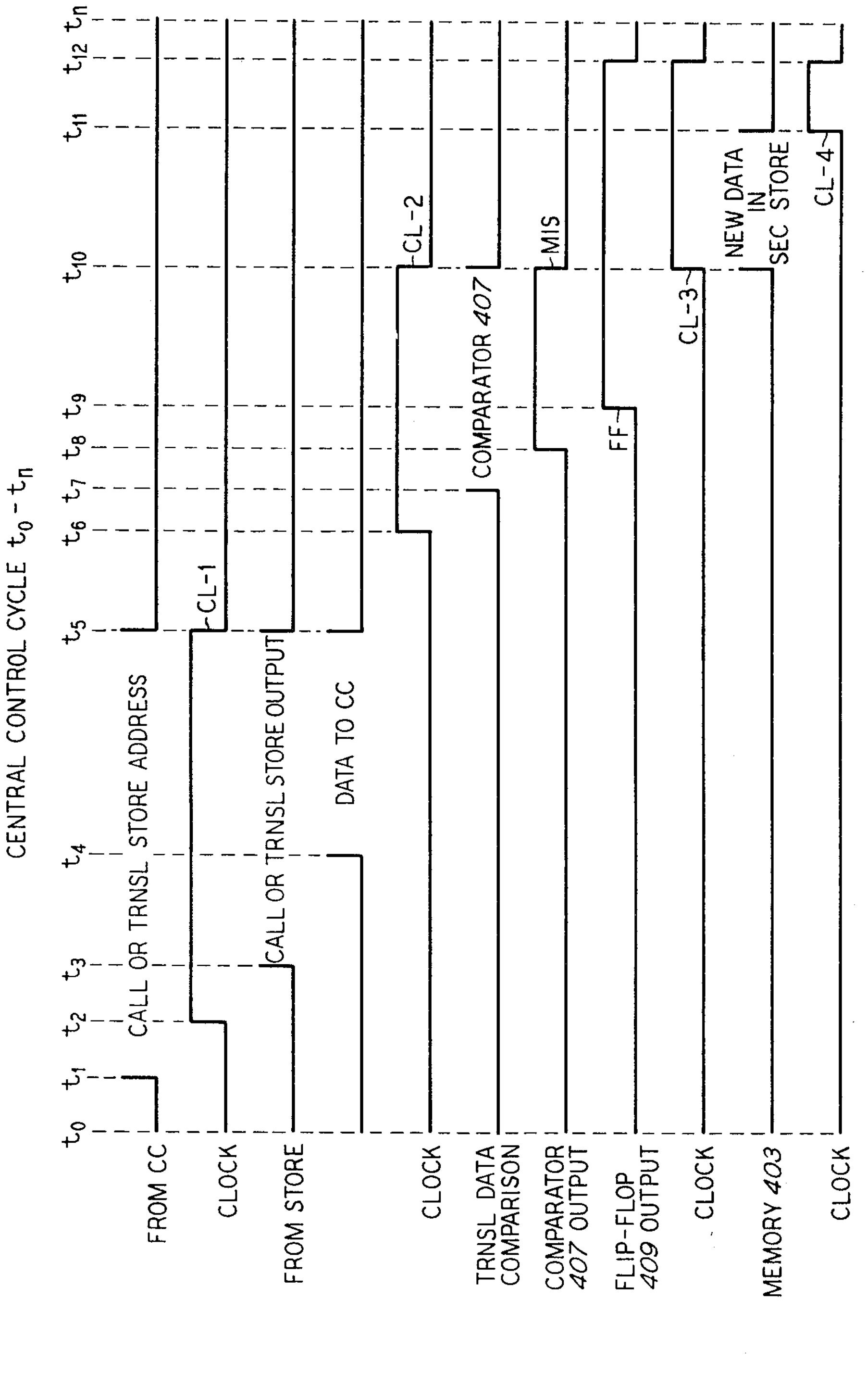

The updating of the translation data in an electronic switching system in accordance with this invention, is accomplished during a normal central control cycle in its access to the call store. In the adaptation of this invention to the electronic switching system referred to hereinbefore, however, the normal access time of a call store by central control is reduced to permit an immediate subsequent data comparison operation in the manner to be described during a single central control operative cycle. Thus the normal access time in accordance with this invention is limited to the first half of the latter cycle, the data comparison operation being inserted during the second half of the cycle. During the first half of the cycle, central control can read in the normal manner from a call store of the system any information stored therein at the address designated to accomplish its call completion operation. Alternatively, if translation data is required from the secondary translation store 400, this can also be obtained during the first half of the control cycle. More specifically, during a normal interrogation of a call store by central control 100, information in the form of an *n*-bit code identifying a particular call store as well as the location within memory at which the required data is stored, is transmitted from central control 100 via a cable 101 to the call store address bus 201 and cable 202. This occurs during the period indicated in FIG. 2 as time $t1$ to time $t5$. A clock pulse CL-1 generated by timing circuits within central control 100 is transmitted therefrom via conductor 102 to synchronize the information output from the call store 200, this information being returned to central control 100 via cable 203, call store readout bus 204, and cable 103, where the information received may be employed to control the next step in the operation of establishing a calling connection. The call store information output is shown in FIG. 2 as occurring at time $t3$ to $t5$ and received by central control 100 at time $t4$ to $t5$.

If a request is made by central control 100 for translation data, information again in the form of an *n*-bit code identifying the secondary translation store 400 and the location within its memory at which the required data is stored, is transmitted from central control via the cable 101, and the call store address bus 201. However, at this time, since the *n*-bit code identifies the secondary translation store 400, the information is transmitted via cable 205 to a group of *n*OR gates 401-1 through **401-*n*, the outputs of which are applied to an address decoder 402. The translation store selection information from central control 100 is decoded to energize a single output of the decoder 402 to select for readout of a memory 403 a word address containing the required translation data from completion of the central control operation. This data is transferred to a memory output buffer 404. At time $t4$ clock pulse CL-1 is also applied to an OR gate 405, the output of which is employed to read the buffer 404. The information thus read out of the memory 403 is transmitted to central control 100 via cable 406, call store readout bus 204, and cable 103. The foregoing describes a normal interrogation of either a translation store or a call store depending upon the nature of the information required by central control. The output of the translation store 400** and its acceptance by central control is also understood to occur at the times indicated for call store information.

Advantageously, according to this invention, the contents of secondary translation store 400 is updated or checked for currency of information after the forgoing normal readout operation is completed. This is accomplished by comparing the contents with the contents of the primary translation store 300. The latter store, the memory of which may comprise any magnetic disc or drum memory well known in the art, has its storage surface divided into two areas: on the tracks of one area is stored the presently valid translation data and on the tracks of the other area is stored the most recent changes in the data received from the system inputs. The two storage areas are used alternately to store the two classes of data; thus, while the presently valid data is being read out for comparison with that in the secondary translation store 400, the latest changes in data are being written into a new data storage area. The latter may next be interrogated while still more recent data is written into the other storage area. Which area is being interrogated during a particular comparison operation is controlled by a multiple switch 301 which selectively connects the two sets of readout heads of the store 300 to the translation data circuit of the invention. Although the switch 301 is shown in simple symbolic form it is apparent that the switching action may be accomplished by any electronic means known in the art, advantageously in the present case, whenever the entry of new changes in data occasions its operation. Typically, three classes of information are received from the primary translation store 300: in addition to the translation data, address and timing information are also obtained during readout. The following section will describe the operations required to update the contents of a secondary translation store after it has been placed in a standby mode by central control. As previously indicated, the active secondary translation store supplies all translation data to central control.

Multiple switch 301 is thrown in such a way to connect the readout heads of the new data area of the store 300 to circuits of the system. An address generator 304, in the form of a binary counter, is provided, the contents of which is incremented periodically by the rotational timing output of store 300 via cable 305, contacts of switch 301 and conductor 314. The address information is transmitted via switch 302 operated upon direction from central control to an address match register where the information is stored.

Translation data and address information are received via a cable 305, contacts of the switch 301, and conductors 306 and 307, and applied to the inputs of an address shift register 308 and a data shift register 309, respectively. The data and address information is transmitted serially and the stepping of the two registers is synchronized with the bit readout of the store 300 by bit timing pulses received via cable 305 and conductor 310. At each step of the registers 308 and 309 information is typically available at their parallel outputs. However, only when a complete data word and address word have been received are the outputs of the registers 308 and 309 permitted to proceed to the next stage of the comparison circuitry.

This is accomplished by applying the outputs of the registers to groups of AND gates and enabling the gates by an end-of-word signal from the store 300. Thus, the parallel outputs of the register 308 are applied to a group of AND gates 311-1 through 311-*m* and the parallel outputs of the register 309 are applied to a group of AND-gates 312-1 through 312-*m*. The end-of-word signal pulse is received from the store 300 via cable 305 and conductor 313 to be applied as an enable signal simultaneously to the other input of each of the gates 311 and 312. The end-of-word signal occurs simultaneously with a bit timing pulse so that the information words stored in the registers 308 and 309 are applied to the output gates only when a complete word has been received.

The address information read out of the store 300 and stored in the address register 308 is compared with address information stored in the address match register 303 by means of an address comparator circuit 320. In the latter circuit logical product operations are performed on the corresponding outputs of the registers 303 and 308 at the occurrence of the end-of-word signal transmitted to the gates 311. If a match exists for each of these corresponding outputs, a match signal is generated by the comparator 320 to control operations of the system which may now be considered. The translation data read out of the store 300 at the same time as the address information, it will be called, was stored in data shift register 309 and thereafter applied to corresponding inputs of the AND gates 312. The end-of-word signal generated at the readout of the store 300 enables the latter gates at the same time that the gates 311 passed on the address information to the comparator 320. The outputs of the gates 312 are transmitted to a second group of AND-gates 321-1 through 321-*m*. When the comparator circuit 320 verifies the identity of the addresses from the address match register 303 and the address shift register 308 by the generation of a match signal, the latter signal is applied at two points in the system. At one point it is applied to the other inputs of each of the gates 321 which gates are as a result enabled to transfer the translation data to a data buffer register 322. The match signal from comparator circuit 320 is also applied to set a flip-flop 323. Obviously, if the contents of register 303 failed to agree with that of register 308, no match signal would be generated by the comparator 320. In this case the flip-flop 323 would remain in the reset state as switched thereto by the end-of-word signal from the primary store 300. Nor would an enable signal be applied to the gates 321 to transmit the updated translation data from the data register 309 to the data buffer register 322. At this point, the registers 308 and 309 are in the clear state and as the memory 300 proceeds through the next cycle of operation, new address and data information are introduced into these registers preparatory to another comparison operation and the ultimate generation of a match signal from comparator 320.

When the flip-flop 323 is set by such a match signal a high-level output of the latter circuit is applied to one of the inputs of an AND gate 324. At time *t*6 to *t*10 a second clock pulse CL-2 is generated at central control 100 and is applied via conductor 105 to the other input and AND gate 324 which latter gate at this time is enabled to generate an output signal. This signal is applied to control two operations in the system. At one point the signal is employed in conjunction with the output information states of the address match register 303 to enable a group of AND-gates 325-1 through 325-*n*. The register 303, it will be recalled, contains the address supplied by central control 100, the data contents of which in the secondary translation store 400 is to be checked. Accordingly, at time *t*6 output signals from the gates 325 are transmitted via cable 326 to the other inputs of the group of OR gates 401. This address information is decoded by the address decoder 402 to energize a single one of its outputs defining a word address in the memory 403 the contents of which are to be checked for currency. This translation data is read out of the memory 403 and stored in its output buffer register 404. This operation is identical to the case when the address information is received via the OR gates 401 from central control 100 as previously described.

The output of the AND gate 324 is also applied via a conductor 327 to the other input of OR gate 405 and therethrough to trigger the buffer 404 to apply its data contents via cable 406 to the call store readout bus 204. The translation data thus read from the secondary translation store 400 is not at this time received by central control 100 since, it will be recalled, the latter received data either from the store 400 or a call store 200 only during the time *t*4 to *t*5 during the first half of the central control cycle. Instead, the translation data read from buffer 404 is transmitted via a cable 406′ to a data comparator circuit 407. Since, in the present comparison operation, as distinguished from that performed by the comparator 320, it is necessary to determine only whether or not the contents of the address of the secondary store 400 under examination agrees with that of the corresponding address of the primary store 300, it is of interest only if a mismatch exists between the two information groups. Accordingly, the data comparator circuit 407 generates an output signal only upon that occasion. To accomplish this inverse operation, the contents of the data buffer register 322 are applied to the inputs of the comparator circuit 407 through a group of inverter circuits 408-1 through 408-*m*. The circuits of the comparator 407 are so arranged that no output will be generated when none of the bits of the two information words agree. On the other hand, when any one of the bits agree in value, a mismatch signal MIS is produced. This signal is indicated in FIG. 2 as occurring at time *t*8 to *t*10.

If the information from the buffer 322 and that read out of memory 403 agree and no mismatch signal is generated, no further action is required in connection with the address identified in the memory 403 and stored in the address match register 303 or in connection with the translation data stored therein. This will be the case if no recent change has been made in that data. For purposes of description, it will be assumed that a recent change had occurred in the data stored in the address of memory 403 under consideration. Returning to the information output of buffer register 322, it is noted in the drawing that its contents are also applied to corresponding inputs of a write amplifier 411. The latter amplifier has its outputs connected to the bit write conductors of the memory 403 and applies write currents to those conductors in a manner which may now be considered. The mismatch signal MIS is applied to the set input of a flip-flop 409 which switches at the time *t9* to a high level output indicated in FIG. 2 by the waveform FF. This output is applied to one input of an AND gate 410. At time *t9* a clock pulse CL-3 is applied to the other input of the gate 410 from central control 100 via a conductor 106. As the gate 410 is enabled its output signal triggers the write amplifier 411 to apply at time *t10* the aforementioned write currents to the bit write conductors of the memory 403. During this time the word address conductor defining the address of the translation data word which is to be updated is being energized by the decoded output of the decoder 402 and the new translation data word originally read out of the primary store 300 and stored in the data buffer 322 is written in the word address of the memory 403 under consideration. The updating of the latter address with the most recent change in translation data in the primary store 300 is now completed. The circuit is prepared for the next comparison cycle of operation by the application of a final clock pulse CL-4 applied from central control 100 via conductor 107 to reset the flip-flop 409. This clock pulse is initiated at time *t11* at the termination of the rewrite operation in the memory 403 to reset flip-flop 409 at time *t12*. The flip-flop 323 is reset by the end-of-word signal received from the primary store 300 at the same time that it enables the gates 311 and 312 preparatory to receiving a match output signal from the comparator circuit 320.

In the foregoing description of the organization and operation of this invention, one possible comparison operation was considered in which all possible addresses of the secondary translation store 400 were selected by central control 100 for a recent change check. This was accomplished by the control of the switch 302 via which the addresses received from address generator 304 were stored in the address match register 303. In an alternative mode of operation used to routinely audit translation data, central control 100 may provide one address of the secondary translation store 400 the contents of which is to be compared with the latest translation data. The corresponding address of the valid data area of the primary store 300 is accordingly interrogated for its updated contents. The address information from central control 100 is transmitted via a conductor 104 and switch 302 operated upon direction from central control 100 to an address match register 303 where the information is stored. The circuit then performs in the same manner described in the foregoing comparison operations on the data corresponding to this single address and corrects the contents of the secondary translation store if it disagrees with that in the primary translation store.

The foregoing is considered to be one illustrative embodiment of the present invention and it is to be understood that various and numerous other arrangements may be devised by one skilled in the art without departing from the spirit and scope of the invention as defined by the accompanying claims.

What is claimed is:

1. In a telephone system, the combination comprising a primary store for storing a first plurality of information words, each of said words comprising a data portion and an address portion defining the location in said primary store of an information word, a secondary store for storing a second plurality of information words, each of said words comprising a data portion and an address portion defining the location in said secondary store of an information word, a first address register for storing the address portion of a predetermined one of said second plurality of information words, a data register, a second address register, means for transferring the data portion and the address portion of a predetermined one of said first plurality of information words from said primary store to said data register and said second address register, respectively, means for comparing the address portion of said information words in said first and second address registers and for generating a match signal when said address portions agree, and means responsive to said match signal for transferring said data portion of said predetermined one of said first plurality of information words in said data register to the location in said secondary store defined by said address portion in said first address register.

2. In a telephone system, the combination comprising a primary store for storing a first plurality of information words, each of said words comprising a data portion and an address portion defining the location in said store of an information word, a secondary store for storing a second plurality of information words, each of said words also comprising a data portion and an address portion defining the location in said secondary store of an information word, a first address register for storing the address portion of a predetermined one of said second plurality of information words, a data register, a second address register, transfer means for transferring the data portion and the address portion of a predetermined one of said first plurality of information words from said primary store to said data register and said second address register, respectively, first means for comparing the address portion of said information words in said first and second address registers and for generating a match signal when said address portions agree, means responsive to said match signal for reading from said secondary store the data portion of said predetermined one of said second plurality of information words stored at a location defined by the address portion stored in said first address register, second means also responsive to said match signal for comparing said last-mentioned data portion and said data portion stored in said data register and for generating a mismatch signal when said data portions disagree, and means responsive to said mismatch signal for transferring the data portion in said data register to the location in said secondary store defined by said address portion in said first address register.

3. In a telephone system, the combination according to claim 2, in which said first plurality of information words is stored in two areas of said primary store, a first area containing words of said first plurality of information words in which the data portion of each of said words contains old information and a second area containing other words of said first plurality of information words in which the data portion of each of said words contains new information, and in which said transfer means includes means for switching between said first and second areas of said primary store.

4. In a telephone system, the combination according to claim 2, in which said primary store generates a timing signal after each transfer of an address portion of a predetermined one of said first plurality of information words to said second address register, and also comprising means responsive to said timing signal for advancing said first register to an address portion defining the location in said secondary store of a succeeding information word.

5. In a telephone system having common control, the combination comprising a primary store for storing a first plurality of information words each comprising a translation data group and an address data group, a secondary store for storing a second plurality of information words each comprising a translation data group and an address data group, means including address decoder means operated responsive to coded signals from said common control for reading from said secondary store a particular translation data group during a first portion of the operative cycle of said common control, a first address register having stored therein a predetermined one of the address data groups of said second plurality of information words, readout means for reading from said primary store during a second portion of said operative cycle a translation data group and an address data group of said first plurality of information words and for storing said last-mentioned translation data group in a data register and said last-mentioned address data group in a second address register, first comparator means for comparing the address data group in said first address register and the address data group in said second address register and for generating a match signal when said address data groups in said registers agree, means including said decoder means operated responsive to said match signal for identifying in said secondary store the storage location defined by said address data group in said first address register, means also responsive to said match signal for reading from said secondary store a translation data group stored at said last-mentioned storage location, second comparator means for comparing said last-mentioned translation data group and the translation data group stored in said data register and for generating a mismatch signal when said last-mentioned translation data groups disagree, and means responsive to said mismatch signal for writing in said last-mentioned storage location of said secondary store the translation data group stored in said data register.

6. In a telephone system, the combination according to claim 5 in which the address data group stored in said first address register is determined by said common control.

7. In a telephone system, the combination according to claim 5 also comprising a counter circuit operated responsive to timing signals from said primary store for advancing said first register to an address data group defining the location in said secondary store of a succeeding information word.

8. In a telephone system, the combination according to claim 5, said primary store having a first and a second storage area each containing said first plurality of information words, said first area containing old translation data groups and said second area containing recently changed translation data groups, and in which said readout means includes means for switching between said first and second storage areas of said primary store.

9. In a telephone switching system having a common control, a first store for storing current customer service information, said first store being operable responsive to address signals from said common control to supply said current information for completing customer calls during a first phase of an operative cycle, a second store having a first section for storing recent change customer service information, means for reading said recent change information from said first section of said second store and temporarily storing said last-mentioned information in a buffer register, means responsive to second address signals from said common control during a second phase of said operative cycle for periodically reading said current information from said first store, a comparator means for comparing said recent change information in said buffer register and said current information read from said first store to generate a mismatch signal when said last-mentioned information groups disagree, means responsive to said mismatch signal for writing said recent change information contained in said buffer register in said first store, said second store having a second section for storing updated recent change customer service information, and means for switching between said buffer register and said first and second sections of said second store.

10. In a telephone switching system, a central control, a first store for storing information words comprising translation data and address data, a second store for storing information words also comprising said translation data and said address data, means responsive to instruction from said central control for reading particular translation data from said second store during a normal read phase of an operative cycle of said central control, a first address register having stored therein address data for a predetermined one of said information words, a second address register, a data register, means for reading information words from said first store during an updating phase of said operative cycle and for storing the translation data and the address data of said words in said data and second address registers, respectively, first comparator means for comparing the address data in said first and second registers and for generating a match signal when the address data in said last-mentioned registers agree, means responsive to said match signal for reading the translation data from said second store at the location defined by the address data in said first address register, second comparator means for comparing said last-mentioned translation data and the translation data contained in said data register and for generating a mismatch signal when said last-mentioned translation data groups disagree, and means responsive to said mismatch signal for writing in said second store the translation data contained in said data register at the location in said second store defined by the address data in said first address register.

11. In a telephone switching system, the combination as claimed in claim 10 also comprising means for selectively introducing address data into said first address register from said central control and for stepping said first address register to introduce therein address data defining successive storage locations in said second store.

12. In a telephone switching system, the combination according to claim 11 in which said means for stepping said first address register is operated responsive to address timing signals from said first store.

* * * * *

UNITED STATES PATENT OFFICE
CERTIFICATE OF CORRECTION

Patent No. 3,636,262 Dated January 18, 1972

Inventor(s) Glover D. Johnson

It is certified that error appears in the above-identified patent and that said Letters Patent are hereby corrected as shown below:

Column 3, line 36, "be come" should read --become--. Column 4, line 46, "nOR" should read --n OR--. Column 4, line 51, "from" should read --for--. Column 4, line 53, "t4" should read --t2--. Column 5, line 71, "called" should read --recalled--. Column 6, line 28, "and" should read --of--. Column 7, line 32, "in" should read --from--. Column 10, line 23, "for" should read --of--.

Signed and sealed this 20th day of June 1972.

(SEAL)
Attest:

EDWARD M.FLETCHER,JR.
Attesting Officer

ROBERT GOTTSCHALK
Commissioner of Patents